United States Patent Office 2,939,795
Patented June 7, 1960

2,939,795
PRINTING INKS CONTAINING UREA HYDROGEN PEROXIDE

Paul Lecompte, Versailles, France, assignor to Societe Anonyme dite: Etablissements Lefranc, Paris, France, a corporation of France No Drawing. Filed Apr. 24, 1957, Ser. No. 654,662

Claims priority, application France Apr. 27, 1956

1 Claim. (Cl. 106—28)

The present invention relates to a process of oxidation developed with a view to the drying and hardening of oxidisable simple or compound film-forming substances used for the preparation of printing inks.

It is well known that the drying of oxidisable film-forming substances, of which the basic type is linseed oil, rests on the mechanism by which the preparation considered has added to it a pro-oxygen substance, commonly known as a siccative or drier, which acts as an oxidation catalyst, that is to say which fixes the oxygen of the ambient air at the level of the film-forming substance, this process requiring a time which varies between 24 and 72 hours. A process of this kind is clearly incompatible with the servitudes of the modern mechanical devices used in printing and working at high speed.

The principle of the present invention consists in a specific physio-chemical process of oxidation comprising two stages, a first stage characterised by a localised static condition in the center of the oxidisable film-forming substance and a second dynamic stage of oxidation characterised in that the oxidation is initiated by physio-chemical mechanisms appropriate to the said static condition of oxidation and due to this fact prepare in situ the drying and hardening of the oxidisable film-forming substance without using the ambient air as an essential source of oxygen.

Within the framework of the principle as defined above, and in accordance with a first feature of the invention, the first stage is obtained by utilising as a reserve of local oxygen in situ the compound of urea hydrogen peroxide, corresponding to the formula $NH_2$—CO—$NH_2$, $H_2O_2$, which compound splits up into oxygen, water and urea; the said compound is compatible with the mechanical arrangements of printing, and it leads to the preparation of an ink which is stable under the normal conditions of storage and, at the same time, in the static devices of a machine such as the ink reservoir.

The first stage of the static oxidation device which has just been described can only react under the influence of special physio-chemical forces which form an indivisible general combination to constitute the second dynamic stage of oxidation, without which forces the properties of the compound of urea hydrogen peroxide would be inoperative.

Within the scope of the principle defined above, and in accordance with a further characteristic feature of the invention, the second dynamic stage of oxidation is characterised by the acition of the combination of three factors acting consecutively, namely: the action of the water contained in the paper to an average content of 6%, the action of ultra-violet radiation, and the action of the oxidation catalyst, such as the organic salts of cobalt or of manganese.

The mechanism of the combination of all the factors referred to is as follows: at the moment of printing, the ink which contains a large reserve quantity of compounded oxygen, comes into contact with the paper; the compound of urea hydrogen peroxide, with a great affinity for water, becomes hydrated and dissociated in the body of the paper into free urea and saturated peroxide of hydrogen; the latter, which is very sensitive to ultra-violet radiation emitted by suitable apparatus and correctly arranged on the path of the paper, is subjected at the same time to the illumination from a powerful source of ultra-violet rays which decompose it into water and free oxygen; finally the oxygen liberated in situ is fixed on the oxidisable material by the action of a catalyst, such as an organic salt of cobalt.

The examples given below show the applications of the invention:

Example 1

| | |
|---|---:|
| Glycerol-phthalic resin | 300 |
| Weak linseed varnish | 400 |
| Urea hydrogen peroxide | 40 |
| Colorings | 250 |
| Drier | 10 |
| | 1000 |

This ink contains a reserve of oxygen of 4.6 litres per kg.; it is suitable for the printing conditions of a rotary press of 9,000 revolutions per hour. If the paper is synchronously irradiated by a source of ultra-violet rays with a power of 4,000 watts, it will be possible to print for 8 hours running without any risk of deposits of ink on the members which handle the paper adversely affecting the quality of the print.

Example 2

| | |
|---|---:|
| Glycerol-phthalic resin | 250 |
| Weak linseed varnish | 400 |
| Urea hydrogen peroxide | 95 |
| Colorings | 245 |
| Drier | 10 |
| | 1000 |

This ink contains a reserve of oxygen of 11 litres per kg.; it is suitable for the printing conditions of a rotary press of 15,000 revolutions per hour. If the paper is synchronously irradiated by a source of ultra-violet rays with a power of 8,000 watts, it will be possible to print for 8 hours running without any fear that the deposits of ink on the members which handle the paper may adversely affect the quality of the printing.

Example 3

| | |
|---|---:|
| Weak linseed varnish | 500 |
| Urea hydrogen peroxide | 60 |
| Drier | 10 |
| Colorings | 430 |
| | 1000 |

In this example, the reserve of oxygen amounts to 6.1 litres, and the proportion is 30.5 litres of oxygen per litre of film-forming substance.

What I claim is:

In a printing ink which dries by oxidation and characterized by improved drying in situ when exposed to ultra-violet energy, said ink comprising a pigment, a vehicle and as an oxidizing agent hydrogen peroxide urea in a proportion of 4 to 9.5% by weight, said oxidizing agent being effective, upon application of the ink to paper and in contact with the normal moisture content thereof, to cause progressive and auto-catalytic oxidation which is enhanced by ultra-violet energy, thereby causing immediate drying of the printed matter.

(References on following page)

References Cited in the file of this patent

UNITED STATES PATENTS

| | | |
|---|---|---|
| 1,045,451 | Stanek | Nov. 26, 1912 |
| 1,922,016 | Schneider | Feb. 19, 1935 |
| 2,109,774 | Hooft | Mar. 1, 1938 |
| 2,259,479 | Morgan | Oct. 21, 1941 |
| 2,406,878 | Corona | Sept. 3, 1946 |

OTHER REFERENCES

"Merck Index," 6th edition, 1952, page 988, column 2.